United States Patent
Cromer et al.

(10) Patent No.: US 7,945,795 B2
(45) Date of Patent: *May 17, 2011

(54) ENABLING A CLIENT DEVICE IN A CLIENT DEVICE/DATA CENTER ENVIRONMENT TO RESUME FROM A SLEEP MORE QUICKLY

(75) Inventors: Daryl C. Cromer, Apex, NC (US); Howard J. Locker, Cary, NC (US); Randall S. Springfield, Chapel Hill, NC (US); Rod D. Waltermann, Rougemont, NC (US)

(73) Assignee: International Business Machines Corporation, Armonk, NY (US)

( * ) Notice: Subject to any disclaimer, the term of this patent is extended or adjusted under 35 U.S.C. 154(b) by 574 days.

This patent is subject to a terminal disclaimer.

(21) Appl. No.: 12/113,249

(22) Filed: May 1, 2008

(65) Prior Publication Data
US 2008/0195852 A1 Aug. 14, 2008

Related U.S. Application Data

(63) Continuation of application No. 11/038,811, filed on Jan. 19, 2005, now Pat. No. 7,386,745.

(51) Int. Cl.
*G06F 1/00* (2006.01)
(52) U.S. Cl. ......... 713/323; 713/300; 713/324; 718/103
(58) Field of Classification Search .................. 713/300, 713/323, 324; 718/103
See application file for complete search history.

(56) References Cited

U.S. PATENT DOCUMENTS

| | | | |
|---|---|---|---|
| 6,263,358 B1 | 7/2001 | Lee et al. | 718/100 |
| 6,633,916 B2 | 10/2003 | Kauffman | 709/229 |
| 6,968,469 B1 | 11/2005 | Fleischmann et al. | 713/324 |
| 6,990,666 B2 | 1/2006 | Hirschfeld et al. | 718/104 |
| 2003/0097487 A1 | 5/2003 | Rietze et al. | 709/325 |
| 2004/0003082 A1 | 1/2004 | Abbondanzio et al. | 709/225 |
| 2004/0088414 A1 | 5/2004 | Flynn et al. | 709/226 |
| 2004/0162977 A1 | 8/2004 | King et al. | 713/2 |
| 2005/0234932 A1 | 10/2005 | Wong et al. | 707/100 |
| 2005/0240668 A1 | 10/2005 | Rolia et al. | 709/223 |

*Primary Examiner* — Vincent T Tran
(74) *Attorney, Agent, or Firm* — Robert A. Voigt, Jr.; Winstead, P.C.

(57) ABSTRACT

A method, computer program product and system for enabling a client device in a client device/data center environment to resume from sleep state more quickly. The resource in the server blade used for suspending the activity of the computing state of the client device in order to enter the client device in a sleep state is not reallocated for a period of time. If the client device indicates to the server blade to resume the client device from sleep state prior to the ending of that period of time, then the server blade reinitializes the computing state using the same resource as used in suspending the computing state of the client device. By using the same resource, steps traditionally implemented in resuming the client device from sleep state are avoided thereby reducing the time in resuming the client device from sleep state.

2 Claims, 6 Drawing Sheets

ENABLING A CLIENT DEVICE IN A CLIENT DEVICE/DATA CENTER ENVIRONMENT TO RESUME FROM A SLEEP MORE QUICKLY

CROSS REFERENCE TO RELATED APPLICATIONS

The present application is a continuation application of pending U.S. patent application Ser. No. 11/038,811, which was filed on Jan. 19, 2005, which is assigned to the assignee of the present invention. The present application claims priority benefits to U.S. patent application Ser. No. 11/038,811.

TECHNICAL FIELD

The present invention relates to the field of computer systems and more particularly to enabling a client device in a client device/data center environment to resume from a sleep state more quickly.

BACKGROUND INFORMATION

Typically, computer systems, including desktop and portable computers, may operate in a power saving mode of operation in order to reduce power consumption. One such power saving mode of operation may be referred to as a "sleep mode" or a "sleep state." A computer system may be invoked to enter a sleep mode of operation after a period of inactivity or upon a user invoking the computer system to enter the sleep mode of operation. The "sleeping" computer system may be "awakened" or resumed upon an event such as a user's keystroke, pressing the power button, receipt of electronic mail, a fax, etc. That is, upon an awakening event, the computer system exits out of the sleep mode of operation and resumes a normal mode of operation.

Typically, a personal computer resumes from sleep state, i.e., reactivating the operating system, in a short amount of time, e.g., less than 5 seconds. Computer users have become accustomed to resuming from sleep state in such a quick manner. However, in certain types of environments, such as a client device/data center environment, the resume time of a computer from sleep state may be significantly longer.

In a client device/data center environment, multiple computer systems, referred to as client devices, may be coupled to a data center that includes a control module and multiple computer systems, referred to as server blades. A client device may refer to a computer system with input/output capabilities but does not include any processing capability. The processing elements may instead reside in a server blade. A server blade may refer to a server that does not include a storage resource, e.g., storage array. The storage resource may be a separate unit that is shared among the server blades.

After a client device enters a sleep state, the client device, upon an awakening event, may send an initialization command to the control module of the data center. The control module may first authenticate the client device. Upon authenticating the client device, the control module may determine the client device's requirements and search the available server blades for a server blade that meets the client device's requirements. The control module may also locate the client device's image file, e.g., operating system, and memory map. Upon identifying the client device's image file, the data center may load the client device's image file into the appropriate server blade. The server blade may then initiate the client device's image file thereby resuming the client device from sleep state. Since the control module has to authenticate the client device, identify a server blade that meets the client device's requirements, identify and load the client device's image file and memory map into the appropriate server blade in order for the appropriate server blade to initiate the client device's operating system, the resume time for a client device in a client device/data center environment is significantly greater than for a typical personal computer.

Since users of personal computers are accustomed to a rather quick resume time, the user of a client device in a client device/data center environment may be dissatisfied with the resume time that takes significantly longer.

Therefore, there is a need in the art for a client device in a client device/data center environment to be able to resume from sleep state in a more quickly manner.

SUMMARY

The problems outlined above may at least in part be solved in some embodiments by not reallocating the resource of the server blade, used for the processing of a client device, for a period of time, referred to herein as the "hold-off period", after the client device enters a sleep state. If the client device indicates to the server blade to resume the client device from the sleep state prior to the ending of the hold-off period, then the server blade reinitializes the computing state of the client device (same computing state as the computing state prior to entering the sleep state) using the same resource as used in suspending the activity of the computing state of the client device. By using the same resource to reinitialize the computing state as used to suspend the activity of the computing state, the control module does not have to authenticate the client device, identify a server blade that meets the client device's requirements, and identify and load the client device's image file and memory map into the appropriate server blade. By not having to authenticate the client device, identify a server blade that meets the client device's requirements, and identify and load the client device's image file and memory map into the appropriate server blade, the time in resuming the client device from sleep state is reduced.

In one embodiment of the present invention, a method for enabling a client device in a client device/data center environment to resume from a sleep state more quickly may comprise the step of creating a profile of the client device. The method may further comprise determining a designated period of time using the profile of the client device and an amount of utilization of resources of a plurality of server blades. The method may further comprise receiving a command from the client device to enter the sleep state. The method may further comprise suspending activity of the computing state of the client device using a resource of a server blade of the plurality of server blades where the resource is used for the processing of the client device. The resource of the server blade is not reallocated during a designated period of time. The method may further comprise reinitializing the computing state of the client device using the resource upon receiving an indication of an awakening event from the client device during the designated period of time.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and a system for enabling a client device in a client device/data center environment to resume from sleep state more quickly. In one embodiment of the present invention, the resource in the server blade used for suspending the activity of the computing state of the client device in order to enter the client device in a sleep state is not reallocated for a period of time. If the client device indicates to the server blade to resume the client device from sleep state prior to the ending of that period of time, then the server blade reinitializes the computing state using the same resource as used in suspending the computing state of the client device. By using the same resource as used in suspending the computing state of the client device, the control module does not have to authenticate the client device, identify a server blade that meets the client device's requirements, and identify and load the client device's image file and memory map into the appropriate server blade. By not having to authenticate the client device, identify a server blade that meets the client device's requirements, and identify and load the client device's image file and memory map into the appropriate server blade, the time in resuming the client device from sleep state is reduced.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
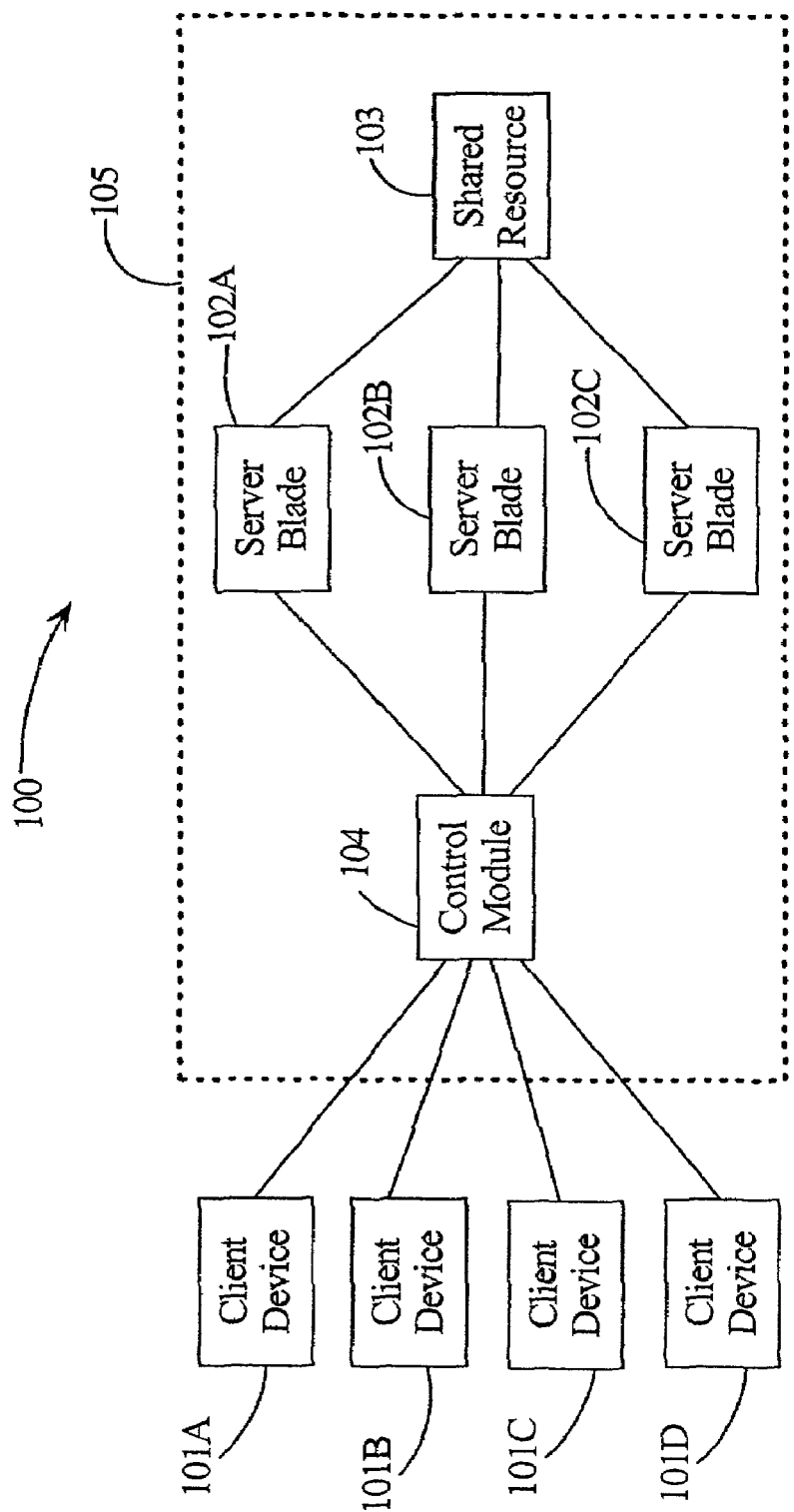
FIG. 1 illustrates an embodiment of the present invention of client device/data center environment.

FIG. 1—Client Device/Data Center Environment

FIG. 1 illustrates an embodiment of the present invention of a client device/data center environment 100. Client device/data center environment 100 may include a plurality of client devices 101A-D coupled to a data center 105. Data center 105 may include a control module 104 coupled to client devices 101A-D. Data center 105 may further include a plurality of server blades 102A-C coupled to control module 104 and a shared resource 103 coupled to server blades 102A-C. Client devices 101A-D may collectively or individually be referred to as client devices 101 or client device 101, respectively. Client device 101 may refer to a computer system that does not include any processing capability. A more detail description of client device 101 is provided below in association with FIG. 2. Server blades 102A-C may collectively or individually be referred to as server blades 102 or server blade 102, respectively. Server blade 102 may refer to a server that does not include a storage resource, e.g., storage array. Server blade 102 may be configured to control the processing capability of a particular client device 101. Referring to FIG. 1, each server blade 102 may be coupled to shared resource 103 which may function as the resource, i.e., storage device, for server blades 102. A more detail description of server blade 102 is provided further below in association with FIG. 3.

Referring to FIG. 1, each client device 101 may send commands, such as a command to enter a sleep state, to control module 104. Control module 104 upon receipt of a command from client device 101 may authenticate client device 101 as well as identify an appropriate server blade 102 that meets client device's 101 requirements. Control module 104 may then forward the received commands to the appropriate server blade 102. A more detail description of control module 104 is provided further below in association with FIG. 4.

It is noted that the connections between the devices described above, e.g., client device 101, server blade 102, shared resource 103, control module 104, may be any medium type, e.g., wired, wireless. It is further noted that client device/data center environment 100 may include any number of client devices 101, server blades 102 and shared resources 103 and that FIG. 1 is illustrative. It is further noted that each server blade 102 may control the processing capability of any number of client devices 101. It is further noted that client device/data center environment 100 may be any type of system that includes a client device 101 and a server blade 102 and that FIG. 1 is not to be limited in scope to any one particular embodiment.

Figure 2:
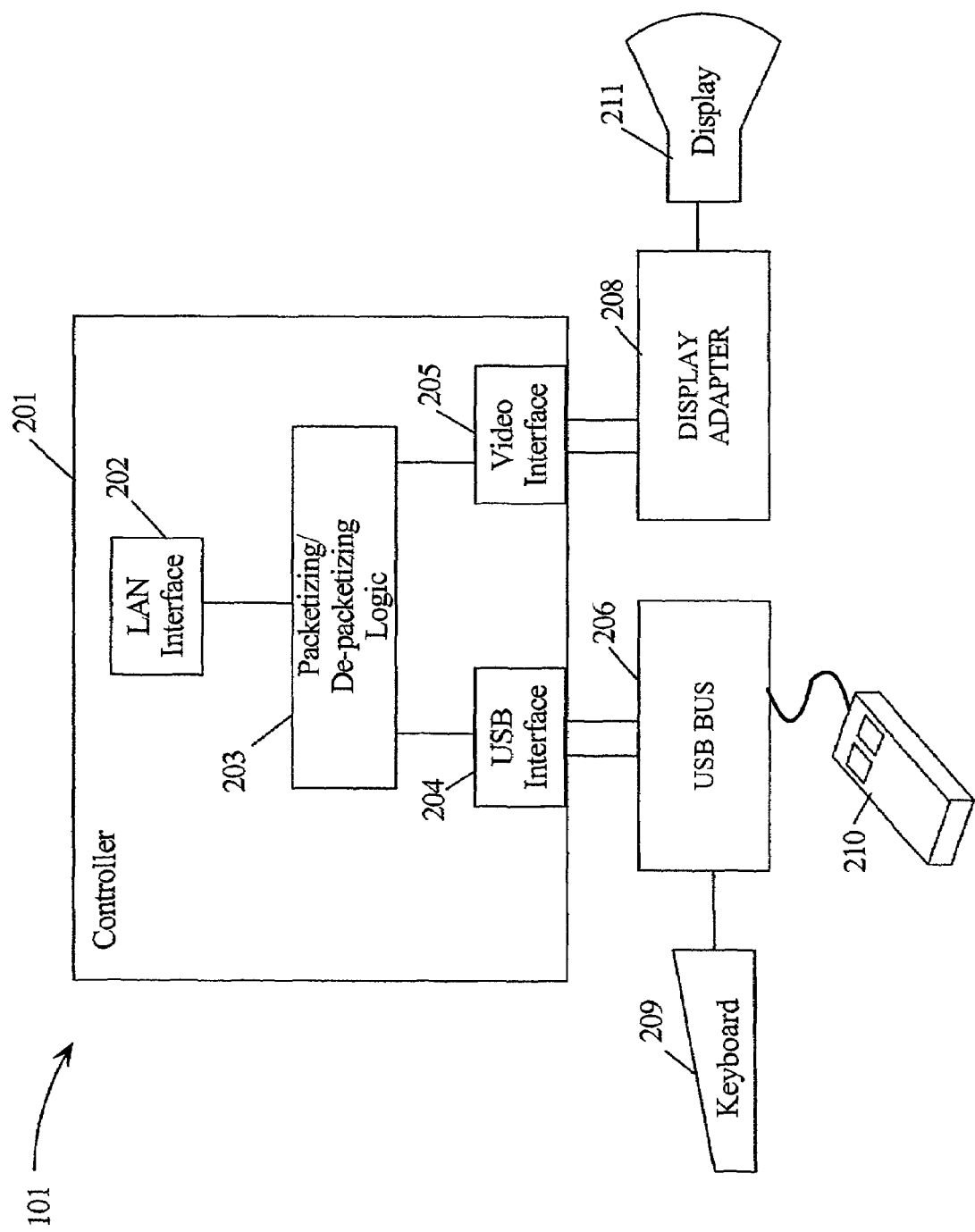
FIG. 2 illustrates an embodiment of the present invention of a hardware configuration of a client device.

FIG. 2—Hardware Configuration of Client Device

FIG. 2 illustrates a typical hardware configuration of client device 101 (FIG. 1) which is representative of a hardware environment for practicing the present invention. Client device 101 may include a controller 201 configured to receive and send packets of data, e.g., Ethernet packets, from and to server blade 102 (FIG. 1) via control module 104 (FIG. 1). Controller 201 may include a Local Area Network (LAN) interface 202 coupled to a LAN network (not shown) which enables client device 101 to communicate with server blade 102 via control module 104. Controller 201 may further include packetizing/de-packetizing logic 203 configured to extract data in the payload of the data packets received over LAN interface 202. Packetizing/de-packetizing logic 203 may further be configured to insert data in the payload of a data packet to be sent to data center 105 (FIG. 1) over LAN interface 202.

Controller 201 may further include a Universal Serial Bus (USB) interface 204 and a video interface 205 coupled to packetizing/de-packetizing logic 203. USB interface 204 may be coupled to USB bus 206. I/O devices may be connected to controller 201 via USB bus 206 and a display adapter 208 coupled to video interface 205. Keyboard 209 and mouse 210 may be interconnected to USB bus 206. Data may be inputted to client device 101 through any of these devices. A display monitor 211 may be connected to video interface 205 by display adapter 208. In this manner, a user is capable of inputting to client device 101 through keyboard 209 or mouse 210 and receiving output from client device 101 via display 211.

Upon the user inputting to client device 101, the input is received by USB interface 204 which is inserted into the payload of a packet by packetizing/de-packetizing logic 203 in order to be transmitted to data center 105 via LAN interface 202. Additionally, the packet received by client device 101 may include a command to update the visual display. Packetizing/de-packetizing logic 203 may extract the command to update the visual display, including information as to how to update the display. Packetizing/de-packetizing logic 203 may then forward the command to update the visual display, including information as to how to update the display, to display 211 via video interface 205 and display adapter 208. In this manner, the display may be continually updated by commands from the appropriate server blade 102.

Figure 3:
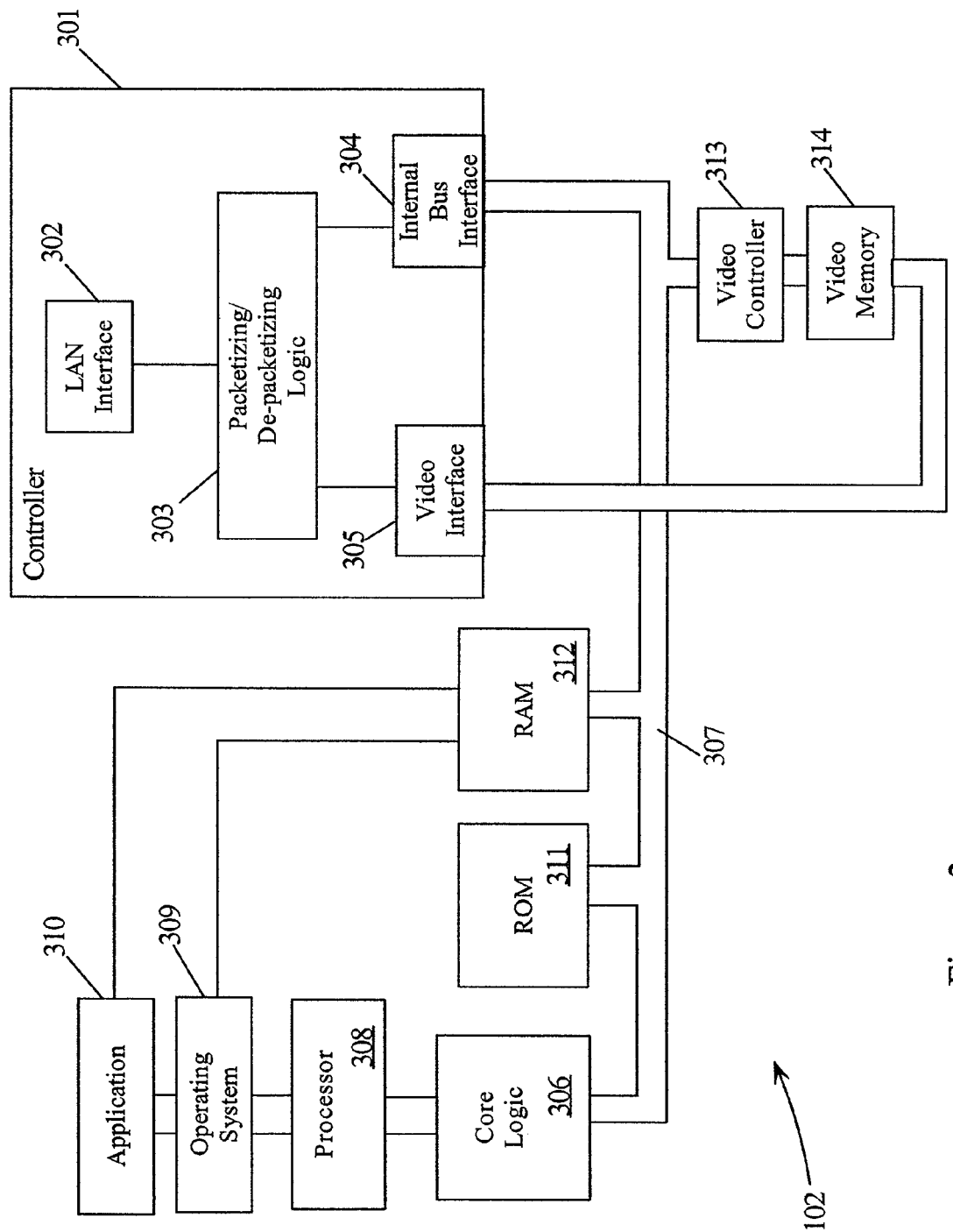
FIG. 3 illustrates an embodiment of the present invention of a hardware configuration of a server blade.

FIG. 3—Hardware Configuration of Server Blade

FIG. 3 illustrates a typical hardware configuration of server blade 102 (FIG. 1) which is representative of a hardware environment for practicing the present invention. Server blade 102 may include a controller 301 configured to receive and send packets of data, e.g., Ethernet packets, from and to client device 101 (FIG. 1) via control module 104 (FIG. 1). Controller 301 may include a Local Area Network (LAN) interface 302 coupled to a LAN network (not shown) which enables server blade 102 to communicate with client device 101 via control module 104 or to shared resource 103 (FIG. 1). Controller 201 may further include a packetizing/de-packetizing logic 303 configured to extract data in the payload of the data packets received over LAN interface 302. Packetizing/de-packetizing logic 303 may further be configured to insert data in the payload of a data packet to be sent to client device 101 over LAN interface 302.

Controller 201 may further include an internal bus interface 304 and a video interface 305 coupled to packetizing/de-packetizing logic 303. Bus interface 304 may be coupled to core logic 306 via system bus 307. Core logic 306 may be the primary processing logic of server blade 102. Processor 308 may be coupled to core logic 306. An operating system 309 may run on processor 308 and provide control as well as coordinate the function of the various components of FIG. 3. Application 310 in accordance with the principles of the present invention may run in conjunction with operating system 309 and provide calls to operating system 309 where the calls implement the various functions or services to be performed by application 310. Application 310 of server blade 102 may include for example, a program for reducing the boot time of client device 101 in client device/data center environment 100 (FIG. 1), as discussed below in association with FIGS. 5 and 6.

Read only memory (ROM) 311 may be coupled to system bus 307 and include a basic input/output system ("BIOS") that controls certain basic functions of server blade 102. Random access memory (RAM) 312 may also be coupled to system bus 307. It should be noted that software components including operating system 309 and application 310 may be loaded into RAM 312 which may function as the server blade's 102 main memory. It is noted that the program of the present invention that reduces the boot time of client device 101 in client device/data center environment 100, as discussed below in association with FIGS. 5 and 6, may reside in either application 310 or in ROM 311.

Referring to FIG. 3, server blade 102 may further include a video controller 313 coupled to bus 307. A video memory 314 may be coupled to video controller 313 and to video interface 305. As stated above, packetizing/de-packetizing logic 303 may be configured to extract data in the payload of the data packets received over LAN interface 302. This data may include a user input command to client device 101, e.g., move mouse 210 (FIG. 2). The input command may be processed by processor 308. Upon processing the received data by processor 308, the command may involve updating the display of display 211 (FIG. 2) of client device 101. The processed command may be sent to video controller 313 to provide a command to client device 101 to update the display of display 211. The command to update visual display 211, including information as to how it should be displayed, is stored in video memory 314 as well as sent to packetizing/de-packetizing logic 303 via video interface 305. Upon receipt of the command to update visual display 211, including information as to how it should be displayed, packetizing/de-packetizing logic 303 inserts the command in a payload of a data packet to be sent to client device 101 via LAN interface 302.

Implementations of the invention include implementations as a computer system programmed to execute the method or methods described herein, and as a computer program product. According to the computer system implementations, sets of instructions for executing the method or methods are resident in the random access memory 312 of one or more computer systems configured generally as described above. Until required by server blade 102, the set of instructions may be stored as a computer program product in another computer memory. Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 4:
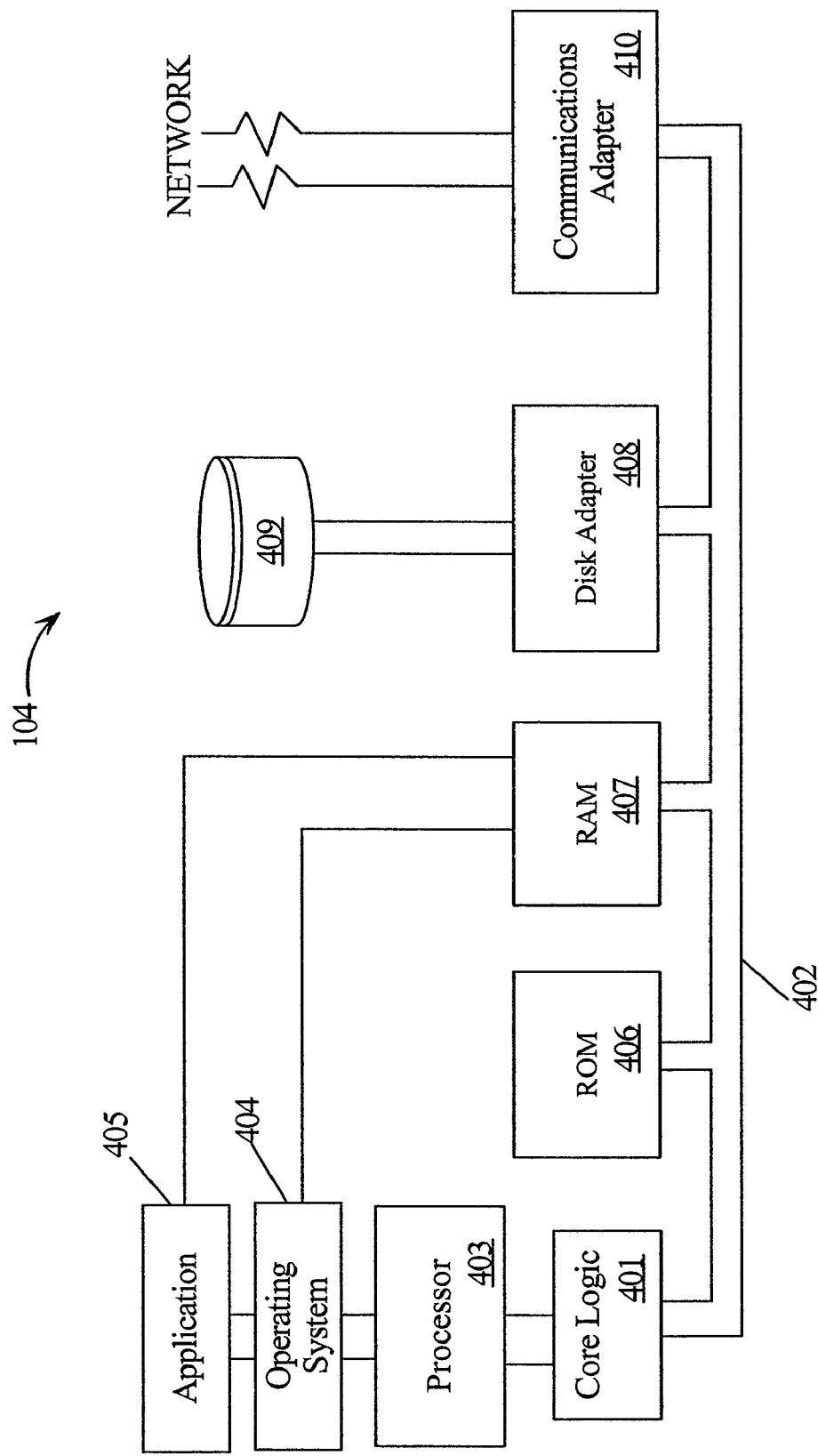
FIG. 4 illustrates an embodiment of the present invention of a hardware configuration of a control module.

FIG. 4—Hardware Configuration of Control Module

FIG. 4 illustrates an embodiment of the present invention of control module 104 (FIG. 1). Control module 104 may comprise a core logic 401, which may be the primary processing logic of control module 104. Core logic 401 is coupled to various other components by a system bus 402. Processor 403 may be coupled to core logic 401. An operating system 404 may run on processor 403 and provide control as well as coordinate the function of the various components of FIG. 4. Application 405 in accordance with the principles of the present invention may run in conjunction with operating system 404 and provide calls to operating system 404 where the calls implement the various functions or services to be performed by application 405. Application 405 of control module 104 may include for example, a program for creating a profile of client device 101 (FIG. 1), as described below in association with FIG. 5, a program for determining the "hold-off period", as described below in association with FIGS. 5 and 6.

Read only memory (ROM) 406 may be coupled to system bus 402 and include a basic input/output system ("BIOS") that controls certain basic functions of control module 104. Random access memory (RAM) 407 and disk adapter 408 may also be coupled to system bus 402. It should be noted that software components including operating system 404 and application 405 may be loaded into RAM 407 which may be control module's 104 main memory for execution. Disk adapter 408 may be an integrated drive electronics ("IDE") adapter that communicates with a disk unit 409, e.g., disk drive. It is noted that the program of the present invention that creates a profile of client device 101, as described below in association with FIG. 5, may reside in either application 405 or in disk unit 409. It is further noted that the program of the present invention that determines the "hold-off period", as described below in association with FIGS. 5 and 6, may reside in either application 405 or in disk unit 409.

Referring to FIG. 4, communications adapter 410 may also be coupled to system bus 402. Communications adapter 410 may interconnect bus 402 with a network, e.g., LAN, enabling control module 104 to communicate with client device 101 (FIG. 1), server blade 102 (FIG. 2).

Implementations of the invention include implementations as a computer system programmed to execute the method or methods described herein, and as a computer program product. According to the computer system implementations, sets of instructions for executing the method or methods are resident in the random access memory 407 of one or more computer systems configured generally as described above. Until required by control module 104, the set of instructions may be stored as a computer program product in another computer memory. Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

As stated in the Background Information section, users of personal computers are accustomed to a rather quick resume time. Since users of personal computers are accustomed to a rather quick resume time, the user of a client device in a client device/data center environment may be dissatisfied with the resume time that takes significantly longer. Therefore, there is a need in the art for a client device in a client device/data center environment to be able to resume from sleep state in a more quickly manner. A method for enabling a client device in a client device/data center environment to resume from sleep state in a more quickly manner is discussed below in association with FIGS. 5 and 6.

Figure 5:
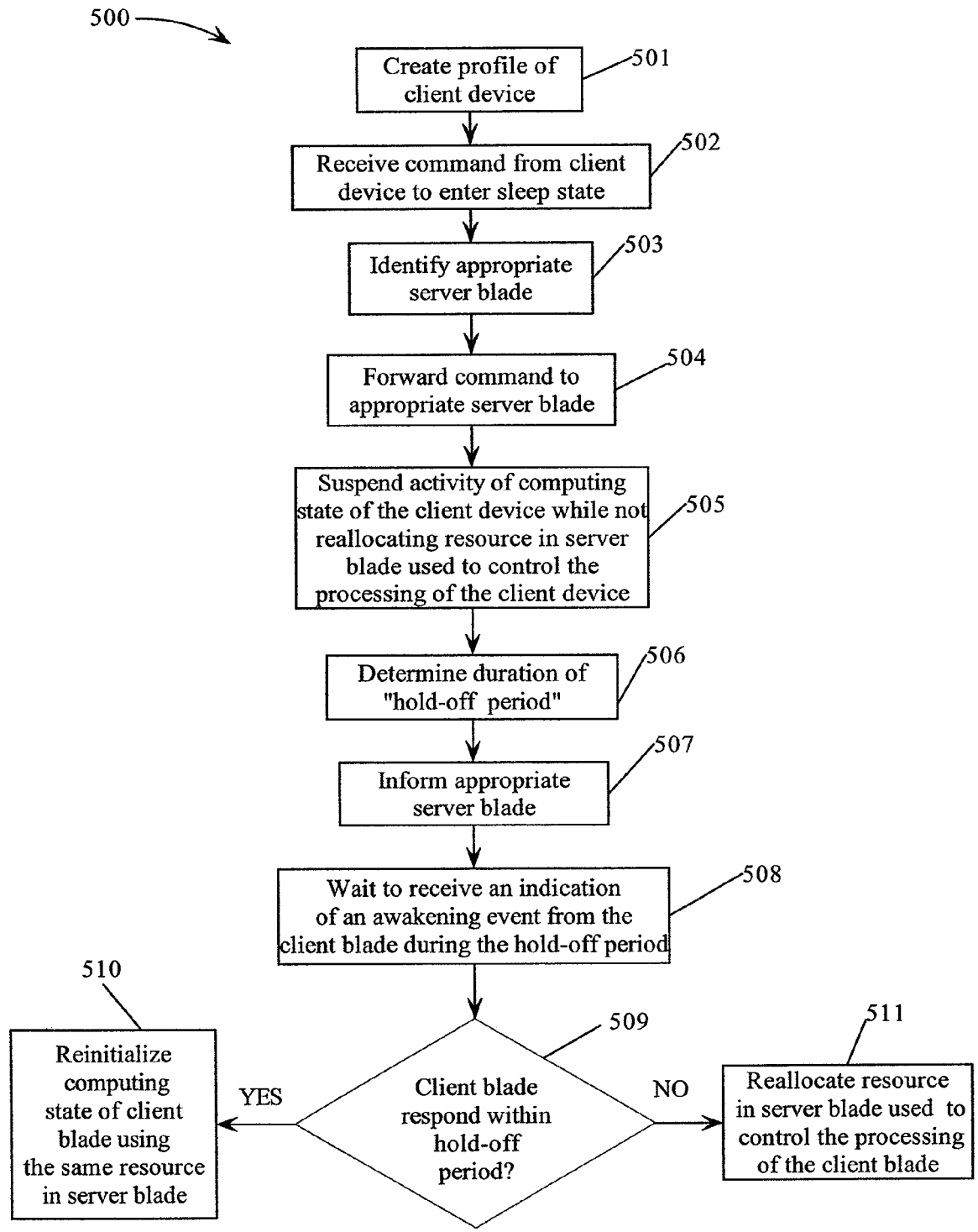
FIG. 5 is a flowchart of a method for enabling a client device in a client device/data center environment to resume from sleep state more quickly in accordance with an embodiment of the present invention.

FIG. 5—Method for Enabling a Client Device in a Client Device/Data Center Environment to Resume from Sleep State in a More Quickly Manner FIG. 5 is a flowchart of one embodiment of the present invention of a method 500 for enabling client device 101 (FIG. 1) in client device/data center environment 100 (FIG. 1) to resume from sleep state in a more quickly manner.

Referring to FIG. 5, in conjunction with FIGS. 1-4, in step 501, control module 104 creates a profile of client device 101. In one embodiment, the profile of client device 101 includes information regarding the type of user, e.g., vice-president, administrative assistant, data entry user, as well as the usage characteristics of the user of client device 101. The usage characteristics of the user of client device 101 may involve tracking the activity levels of the user throughout each day. For example, certain users may continuously use client device 101 from a set period of time, e.g., 9 a.m. to 5 p.m. Monday through Friday. Other users of client device 101 may use client device 101 more sporadically throughout the day. It may be important to note such activity levels as the hold-off period, as discussed below, may be expanded in duration during the times that the user may be more likely to be using client device 101 and vice-versa. In one embodiment, the profile of client device 101 may be created over a long period of time, e.g., weeks, thereby establishing a reliable baseline of usage characteristics. In one embodiment, the profile of client device 101 may be dynamically updated. It may also be important to note the type of user of client device 101 as certain types of users, such as data entry users, may be more likely to be active for a set period of time than other types of users, such as managers. The type of user may be used in determining the duration of the hold-off period as discussed below. An example of profiles created by control module 104 for client devices 101 coupled to control module 104 is provided below in Table 1.

TABLE 1

| Particular Client | Usage Characteristics | Type of User |
|---|---|---|
| Client 101A | 9 a.m.-5 p.m. continuously with limited breaks in usage | Data Entry |
| Client 101B | 7 a.m.-7 p.m. sporadically | Manager |
| Client 101C | 9 a.m.-5 p.m. continuously with break in usage from 12:00-1:00 p.m. | Secretary |
| Client 101D | 6 a.m.-5 p.m. sporadically | Maintenance |

After creation of the profile of client device 101, control module 104 receives a command from client device 101 to enter a sleep state in step 502. Client device 101 may issue a command to control module 104 after detecting a period of inactivity or upon a user invoking client device 101 to enter the sleep mode of operation.

In step 503, control module 104 identifies the appropriate server blade 102 (server blade 102 that meets the requirements of client device 101) to enter client device 101 in a sleep state. In step 504, control module 104 forwards the received command to the appropriate server blade 102.

In step 505, upon receipt of client device's 101 command from control module 104, the appropriate server blade 102 suspends the activity of the computing state of client device 101 using a particular resource of server blade 102. This resource, used for the processing of client device 101, will not be reallocated for a period of time referred to herein as the "hold-off period." The hold-off period refers to a period of time that server blade 102 does not reallocate the resource used in suspending the activity of the operating system of client device 101. A more detail description of the hold-off period is described below.

In step 506, control module 104 determines the "hold-off" period. It is noted for clarity that steps 506 and 507, as discussed below, may be performed during any step in method 500 including prior to the appropriate server blade 102 receiving the command from client device 101 to suspend its computing state. Step 506 may include sub-steps as discussed in association with FIG. 6.

Figure 6:
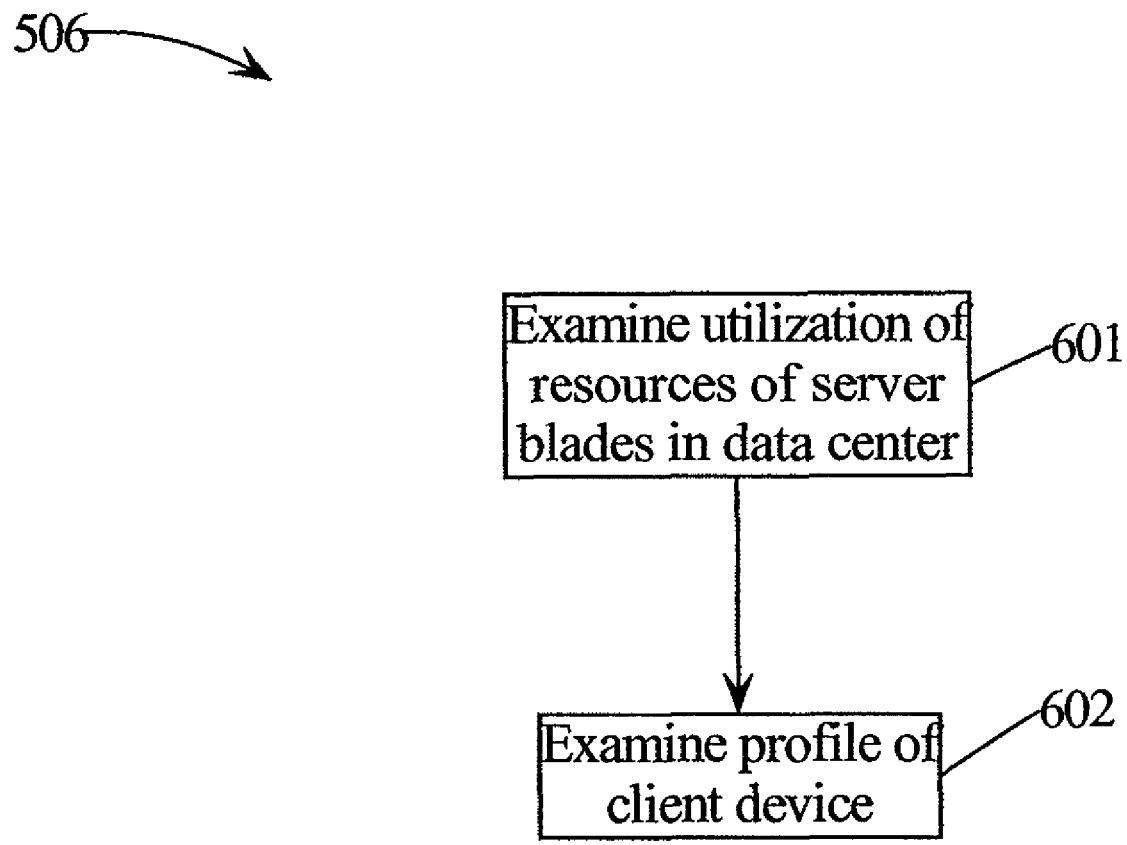
FIG. 6 is a flowchart of the sub-steps of the step of determining the duration of the hold-off period in accordance with an embodiment of the present invention.

Referring to FIG. 6, in conjunction with FIGS. 1-4, in step 601, the duration of the hold-off period may be determined by control module 104 by examining the utilization of the resources of server blades 102 in data center 105. For example, if server blades 102 are currently being heavily utilized, then the hold-off period may be limited since the resource may be readily used for other processing. If, on the other hand, the utilization of the resources of server blades 102 are minimal, then the hold-off period may be longer than normal since the resource may not be readily used for other processing.

The duration of the hold-off period may also be determined by control module 104 by examining the profile of client device 101 in step 602. As stated above, the profile of client device 101 may include such information as the type of user and the usage characteristics of the user of client device 101. This information may be used to determine the duration of time of the hold-off period. For example, if client device 101 enters the sleep mode of operation during the afternoon and client device 101 is typically active during that time, then the duration of the hold-off period may be longer than normal. If, on the other hand, client device 101 enters the sleep mode of operation during the evening and client device 101 is typically not active until the following morning, then the duration of the hold-off period of time may be rather short.

Returning to FIG. 5, in conjunction with FIGS. 1-4, in step 507, control module 104 informs the appropriate server blade 102 the duration of the hold-off period.

In step 508, server blade 102 waits to receive an indication of an awakening event from client device 101 via control module 104 during the "hold-off period." In step 509, server blade 102 determines if it received a command from client device 101 to resume from sleep state within the hold-off period. That is, server blade 102 determines if client device 101 responds within the hold-off period.

If client device 101 responds within the hold-off period, then in step 509, server blade 102 reinitializes the computing state of client device 101 using the same resource as used in suspending the activity of the computing state of client device 101. Since the same resource is used in reinitializing the computing state of client device 101 as used in suspending the activity of the computing state of client device 101, client device 101 resumes from sleep state more quickly since control module 104 does not have to authenticate client device 101, identify server blade 102 that meets client device's 101 requirements, and identify and load client device's 101 image file into the appropriate server blade 102. By not having to authenticate client device 101, identify server blade 102 that meets client device's 101 requirements, and identify and load client device's 101 image file and memory map into the appropriate server blade 102, the time in resuming client device 101 from sleep state is reduced.

If, however, client device 101 does not respond within the hold-off period, then in step 510, server blade 102 reallocates the resource used for the processing of client device 101 to be used for other processing demands.

It is noted that methods 500 and 600 may include other and/or additional steps that, for clarity, are not depicted. It is further noted that methods 500 and 600 may be executed in a different order presented and that the order presented in the discussion of FIGS. 5 and 6 are illustrative. It is further noted that certain steps in methods 600 and 600 may be executed in a substantially simultaneous manner.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A computer program product embodied in a machine readable medium for enabling a client device in a client device/data center environment to resume from a sleep state more quickly comprising the programming steps of:
creating a profile of said client device;
determining a designated period of time using said profile of said client device and an amount of utilization of resources of a plurality of server blades;
receiving a command from said client device to enter said sleep state;
suspending activity of a computing state of said client device using a resource of a server blade of said plurality of server blades, wherein said resource is used for the processing of said client device, wherein said resource of said server blade is not reallocated during a designated period of time;
reinitializing said computing state of said client device using said resource upon receiving an indication of an awakening event from said client device during said designated period of time; and
reallocating said resource of said server blade if said server blade did not receive said indication of said awakening event from said client device during said designated period of time.

2. A system, comprising:
a control module;
a plurality of server blades coupled to said control module;
wherein said control module comprises:
a first memory unit operable for storing a first computer program for creating a profile of a client device in a client device/data center environment and for determining a designated period of time; and
a first processor coupled to said first memory unit, wherein said first processor, responsive to said first computer program, comprises:
circuitry for creating a profile of said client device;
circuitry for determining said designated period of time using said profile of said client device and an amount of utilization of resources of said plurality of server blades;
circuitry for receiving a command from said client device to enter said sleep state; and
circuitry for forwarding said command to a server blade of said plurality of server blades; and
wherein said server blade of said plurality of server blades comprises:
a second memory unit operable for storing a second computer program for enabling said client device to resume from a sleep state more quickly; and
a second processor coupled to said second memory unit, wherein said second processor, responsive to said second computer program, comprises:
circuitry for suspending activity of a computing state of said client device using a resource of said server blade, wherein said resource is used for the processing of said client device, wherein said resource of said server blade is not reallocated during said designated period of time;
circuitry for reinitializing said computing state of said client device using said resource upon receiving an indication of an awakening event from said client device during said designated period of time; and
circuitry for reallocating said resource of said server blade if said server blade did not receive said indication of said awakening event from said client device during said designated period of time.

* * * * *